3,594,460
METHOD FOR PREPARING A LABORATORY COUNTER TOP

Harold L. Rechter, Chicago, and Murray A. Schwartz, Glencoe, Ill., assignors to E. H. Sheldon & Company, Muskegon, Mich.
No Drawing. Filed Aug. 5, 1968, Ser. No. 750,013
Int. Cl. B29h 7/20
U.S. Cl. 264—48          3 Claims

ABSTRACT OF THE DISCLOSURE

A non-warping inorganic counter top sufficiently plastic and tough to permit cutting and bolting in the field, while at the same time being heat and acid resistant, is prepared by extruding, pressing or casting a sand, bentonite and silicate mixture into the desired counter top form and then sealing the pores in the upper portion of the top with epoxy novolak resin and curing the resin.

BACKGROUND AND SUMMARY

Counter tops have heretofore been prepared employing asbestos-filled portland cement and quarried natural stone. Being porous and reactive with acids, such materials are coated. The presence of the asbestos fibers makes the top susceptible to warping. The coatings do not provide adequate heat resistance and also prevent the refinishing by removal of badly worn or reacted counter top surfaces. Further, sawing or cutting in the field brings about breakage of edge portions by reason of the lack of plasticity in the product.

We have discovered that a counter top can be formed by extrusion, pressing or casting while employing sand, bentonite and sodium silicate, and the resulting cast top is rendered tough and plastic by the application thereto of epoxy novolak resin which not only seals the pores in the upper portion of the top but also gives plasticity to the top so that it may be cut without damage in the field.

In some forming operations, the sodium silicate, which is employed as a binder, tends to migrate and form a weak skin which is undesirable, and we find that such migration can be prevented by employing in the mix a small amount of sodium silicofluoride.

DETAILED DESCRIPTION

In the practice of our invention, we mix sand, bentonite and sodium silicate in a relatively wide range of proportions to form the counter top. Generally, we prefer to use about 4 to 6 parts by weight of sand, 1 to 2 parts of bentonite, and 2 to 3 parts of sodium silicate. The mixture is then molded as by extruding or pressing or casting to provide a counter top of the desired size and shape. The body is dried or cured after forming by heating for several hours at approximately 200° F. By sealing the pores in the upper portion of the top with epoxy novolak resin and curing the resin, we find that the top takes on a tough and plastic character and may be sawed or cut in the field without danger of injury.

In applying the resin, we prefer to use a suitable setting agent, as, for example, methyl anhydride. Also, a catalyst may be used, such as, for example, benzyldimethylamine. By way of example, the resin and anhydride may be used in about equal proportions, and the catalyst may be used in a very minor proportion, as, for example, in 1 to 2 weight percent.

In mixing the sodium silicate with the sand and bentonite, we find that there is a tendency for the sodium silicate to migrate, forming a relatively thin skin which closes pores. In order to prevent this, sodium silicofluoride is preferably used in very small proportions, as, for example, in about one percent by weight.

The sand may be varied widely in size and type. When pores of relatively large size are desired, 20-30 mesh may be used. For other uses, 100-mesh sand may be employed to provide smaller pores. The sodium silicate may be the common "water glass" type, and the bentonite may be any bentonite or equivalent ball clay material.

The epoxy novolak resin is preferably combined in about equal proportions with a setting agent, such as methyl anhydride, and employed with a catalyst. The following low viscosity resin blend is satisfactory:

| Materials: | Parts |
| --- | --- |
| Epoxy novolak resin | 100 |
| Methyl anhydride | 88 |
| Benzyldimethylamine | 1.5 |

In the forming operation, the mix of sand, bentonite and sodium silicate suitable for the particular molding operation selected is formed, and the counter top formed by extruding, pressing, casting, etc. The use of the relatively coarse sand grain size insures open porosity, and the porosity is also controlled to some extent by the bentonite clay. The sodium silicate serves as a binder.

In the case of extrusion, we prefer to use a larger amount of the bentonite in order to facilitate extrusion, and it is found that extrusion is highly desirable because less porosity is present in the counter top and thus less resin is required to seal the pores. At the same time, however, there is sufficient porosity so that when the epoxy novolak resin is applied, the desired plasticity and toughness are obtained.

The epoxy novolak resin together with the setting agent and catalyst are applied to the counter top so as to fill at least the top portion of the pores but without coating the top, and after filling the pores the top is subjected to a curing temperature which is preferably in the range of about 200–300° F., and the curing time may vary from about 2 hours to 4 hours or longer. The molecular structure of the epoxy novolak resin is represented by the following idealized structure:

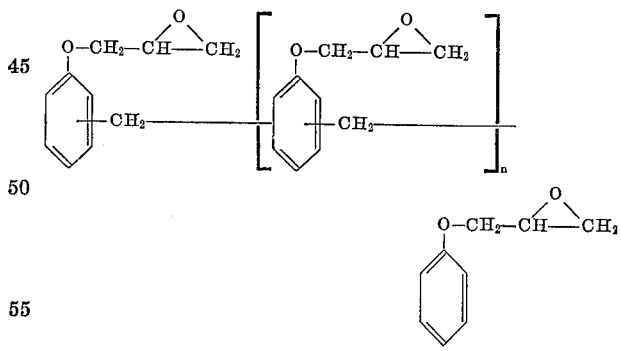

The final product is found to be heat-resistant, acid-resistant, and the top itself becomes plastic and tough, permitting cutting in the field.

Specific examples illustrative of the invention may be set out as follows:

EXAMPLE I

A mix of the following proportions was formed and extruded in a laboratory extrusion machine, producing a 3" wide casting:

| | Lbs. |
| --- | --- |
| 20–30 mesh sand | 3 |
| Bentonite | ¾ |
| Sodium silicate | 1 |
| Water | ⅓ |

The aggregate was a standard test sand, designated as Ottawa No. 190. The bentonite was Bentolite L, a white product of the Georgia Kaolin Company. The silicate is the common "water glass" type, manufactured by the Diamond Alkali Company (Grade 40). The body was place in a drying oven for several hours prior to resin impregnation.

The pores of the extruded top were closed by the following resin blend:

| Materials: | Parts |
|---|---|
| Epoxy novolak resin | 100 |
| Methyl anhydride | 88 |
| Benzyldimethylamine | 1.5 |

Methyl anhydride is a product manufactured and sold by Allied Chemical Company, National Aniline Division, under the trademark Nadic Methyl Anhydride, the full chemical description being methyl 4-endomethylene tetrahydrophthalic anhydride.

The above composition was heated for a few hours at 250° F. to obtain sufficient reduction of viscosity for easy impregnation of the pores without polymerization. The top was then cured for 3 hours at a temperature of 260° F. The resulting top was tough, sawable, and resistant to heat, as, for example, the flame of a bunsen burner, and to acids of all types.

EXAMPLE II

A batch was prepared for casting of three slabs in aluminum pans of roughly 6 x 9 x 1″ dimensions after sanding. The composition used was:

| 20–30 mesh sand | lbs | 6 |
|---|---|---|
| Bentolite L | lbs | 1½ |
| Sodium silicate | lbs | 2 |
| Water | lbs | 1¾ |
| Sodium silicofluoride | oz | 2 |

The sodium silicofluoride functions as a chemical setting agent to inhibit binder migration and warpage on heat curing and drying. This blend can be dried at room temperature in time, or oven dried. One slab was impregnated with epoxy novolak, increasing the density from 100 lbs. per cubic foot as cast to 132 lbs. per cubic foot. The cast structure has considerably more porosity than an extruded body of similar composition, since compacting stresses occur on extrusion. The resin was cured approximately 3 hours at 260° F. and the slab was sanded to obtain smooth surfaces.

The unimpregnated specimens were compared with the impregnated specimen and it was found that the impregnated specimen had become tough and was plastic and could be sawed evenly without damage, while the unimpregnated specimens could not be so treated.

EXAMPLE III

Tests were made on production-type extrusion machines for the forming of a counter top 10″ wide by 1″, the mix or blend being as follows:

| | Lbs. |
|---|---|
| Sand (20–30 mesh) | 75 |
| Bentonite (Bentolite L) | 19 |
| Sodium silicate (Diamond Alkali No. 40) | 35 |

The blend was somewhat sticky, but was found to extrude will, and the mix was extruded after 3 to 4 hours of standing.

EXAMPLE IV

The process was carried out as described in Example III using the following mix:

| | Lbs. |
|---|---|
| Sand (100 mesh) | 60 |
| Bentonite | 18 |
| Sodium silicate | 26 |

The above blend was extruded, producing a top suitable for receiving epoxy novolak resin as described in Example II.

While porous extruded tops as described in Examples I–IV contain pores, the pores can be filled at least in their upper portion or throughout, if desired, to toughen the top and render it sufficiently plastic for cutting in the field without damage to the finished top. At the same time, the resin is heat and acid resistant and the top is able to withstand extreme conditions, such as contact with the flame of a bunsen burner and strong acids.

While in the foregoing specification we have set out specific formulations and procedure in considerable detail for the purpose of illustrating embodiments of the invention, it will be understood that such details may be varied widely by those skilled in the art without departing from the spirit of our invention.

We claim:
1. In a process for preparing a laboratory counter top, the steps of mixing sand, bentonite and sodium silicate in the proportions by weight of about 4–6 parts of sand, 1–2 parts of bentonite, and 2–3 parts of sodium silicate, molding the mix into a counter top having pores therein, drying the body, sealing at least the upper portion of said pores with epoxy novolak resin, and curing said resin at a temperature of about 200–300° F. for about 2 to 4 hours.
2. The process of claim 1 in which sodium silicofluoride is added to said mix to inhibit migration of said sodium silicate.
3. The process of claim 1 in which molding is by extrusion through a die.

References Cited

UNITED STATES PATENTS

| 1,666,828 | 4/1928 | Mellor | 264—62 |
|---|---|---|---|
| 2,371,353 | 3/1945 | Parsons | 264—62 |
| 2,490,049 | 12/1949 | Greger | 264—62 |
| 3,246,060 | 4/1966 | Blume | 264—62 |
| 3,250,833 | 5/1966 | Wagner | 264—62 |

FOREIGN PATENTS

| 514,843 | 11/1939 | Great Britain | 264—62 |

DONALD J. ARNOLD, Primary Examiner

U.S. Cl. X.R.

264—62, 331, 347